(12) United States Patent
Inoue et al.

(10) Patent No.: US 11,165,317 B2
(45) Date of Patent: Nov. 2, 2021

(54) MANUFACTURING METHOD OF ROTOR FOR ROTARY ELECTRIC MACHINE

(71) Applicants: AISIN AW CO., LTD., Anjo (JP); TOYOTA JIDOSHA KABUSHIKI KAISHA, Toyota (JP)

(72) Inventors: Naomi Inoue, Anjo (JP); Hiroaki Wakimoto, Nagoya (JP); Tsuyoshi Miyaji, Toyohashi (JP); Motoki Hiraoka, Toyota (JP); Daisuke Ichigozaki, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 16/742,249

(22) Filed: Jan. 14, 2020

(65) Prior Publication Data

US 2020/0266691 A1 Aug. 20, 2020

(30) Foreign Application Priority Data

Feb. 14, 2019 (JP) .............................. JP2019-024582

(51) Int. Cl.
*H02K 15/02* (2006.01)
*H02K 15/03* (2006.01)
*H02K 1/27* (2006.01)

(52) U.S. Cl.
CPC .............. *H02K 15/03* (2013.01); *H02K 1/276* (2013.01); *Y10T 29/49012* (2015.01)

(58) Field of Classification Search
CPC ........ H02K 15/03; H02K 1/276; H02K 15/02; H02K 1/27; H02K 1/28; H02K 15/024; H02K 3/12; Y10T 29/49012; Y10T 29/49009; Y10T 29/49075; Y10T 29/49078; B29C 45/03; B29L 2031/7498; B29L 2031/749
USPC ............... 29/598, 596, 602.1, 604, 607, 609
See application file for complete search history.

(56) References Cited

U.S. PATENT DOCUMENTS

| 10,622,873 B2 * | 4/2020 | Nagai ..................... H02K 15/03 |
| 2012/0200185 A1 * | 8/2012 | Sano ..................... H02K 1/2766 |
| | | 310/156.01 |

FOREIGN PATENT DOCUMENTS

| JP | H05-022881 A | 1/1993 |
| JP | 2016-129484 A | 7/2016 |
| JP | 2016-220404 A | 12/2016 |

* cited by examiner

*Primary Examiner* — Thiem D Phan
(74) *Attorney, Agent, or Firm* — Oliff PLC

(57) ABSTRACT

A manufacturing method of a core for a rotary electric machine, the method includes inserting a permanent magnet that is not yet magnetized in a magnet insertion hole that is formed in a rotor core; injecting a magnet fixing material in the magnet insertion hole; curing the magnet fixing material by heating the rotor core and the permanent magnet; and magnetizing the permanent magnet before a temperature of the rotor core and the permanent magnet decreases to a normal temperature, after the curing of the magnet fixing material.

7 Claims, 7 Drawing Sheets

MANUFACTURING METHOD OF ROTOR FOR ROTARY ELECTRIC MACHINE

INCORPORATION BY REFERENCE

The disclosure of Japanese Patent Application No. 2019-024582 filed on Feb. 14, 2019 including the specification, drawings and abstract is incorporated herein by reference in its entirety.

BACKGROUND

The disclosure relates to a manufacturing method of a rotor for a rotary electric machine.

A permanent magnet-type rotary electric machine often serves as a driving force source of a vehicle or a power source of a vehicle. For example, as disclosed in Japanese Unexamined Patent Application Publication No. 2016-129484 (JP 2016-129484 A), in such a rotary electric machine, thermoset resin is inserted in a clearance between a permanent magnet and a magnet insertion hole that is formed in a rotor core so that the permanent magnet inserted in the magnet insertion hole is fixed to the rotor core. For example, as disclosed in Japanese Unexamined Patent Application Publication No. 2016-220404 (JP 2016-220404 A), a rotor shaft of a rotary electric machine is inserted in a rotor core in which a rotor insertion hole is expanded by heating, and the rotor shaft is then fixed to the rotor core contracted by heat dissipation. Usually, a step of fixing the permanent magnet to the rotor core and a step of installing the rotor shaft to the rotor core are carried out independently, and an intermediate assembly of a rotor for the rotary electric machine is formed by these steps.

SUMMARY

If the permanent magnet is magnetized before the permanent magnet is inserted in the magnet insertion hole, an attracting force may act on the rotor core and the permanent magnet cannot be appropriately inserted in the magnet insertion hole. Thus, in many cases, the permanent magnet is magnetized after the permanent magnet is disposed in the rotor core. As described above, magnetization is often performed to the intermediate assembly after the permanent magnet is fixed to the rotor core or to the intermediate assembly after the rotor shaft is further installed. As a matter of course, in such a rotary electric machine, a high coercivity is required for the permanent magnet. However, a permanent magnet that has a high coercivity has a characteristic in which the permanent magnet is generally hard to magnetize since a change in magnetic force is less likely to occur. As one method, performing magnetization under environments in which the coercivity of the permanent magnet becomes relatively low, such as under a high temperature environment is conceivable. However, if a heating furnace is provided and magnetization is performed after heating, there is a possibility that manufacturing cost will increase due to the increase in equipment costs and steps.

An exemplary aspect of the disclosure provide a technique in which a permanent magnet that is disposed in a rotor core is appropriately magnetized while an increase in cost is suppressed.

In one aspect, a manufacturing method of a rotor for a rotary electric machine in view of the above includes: inserting a permanent magnet that is not yet magnetized in a magnet insertion hole that is formed in a rotor core; injecting a magnet fixing material in the magnet insertion hole; curing the magnet fixing material by heating the rotor core and the permanent magnet; and magnetizing the permanent magnet before a temperature of the rotor core and the permanent magnet decreases to a normal temperature, after the curing of the magnet fixing material.

In the manufacturing method according to the first aspect, the permanent magnet is magnetized by performing the magnetizing of the permanent magnet before the temperature of the rotor core and the permanent magnet that are heated to cure the magnet fixing material in the curing of the magnet fixing material decreases to the normal temperature. In general, magnetization is easily performed under a high temperature environment since coercivity of the permanent magnet becomes relatively low. In the manufacturing method according to the first aspect, since there is no need to reheat the rotor core when performing the magnetizing of the permanent magnet, there is no need to provide a heating furnace or provide a reheating step. In this way, it is possible to suppress the manufacturing cost of a rotor for the rotary electric machine from increasing. With the manufacturing method, it is therefore possible to provide a technique in which the permanent magnet disposed in the rotor core is appropriately magnetized while an increase in cost is suppressed.

Further features and advantages of the manufacturing method of the rotor for the rotary electric machine will be apparent from the following description of embodiments which is given with reference to the accompanying drawings.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
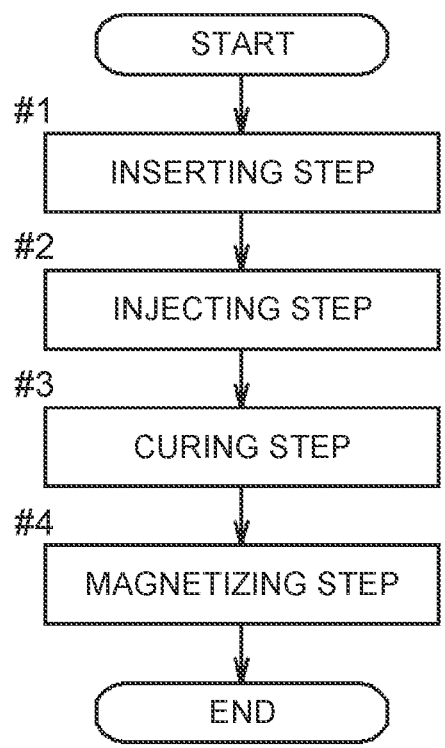
FIG. 1 is a flowchart illustrating an example of a manufacturing method.
Figure 2:
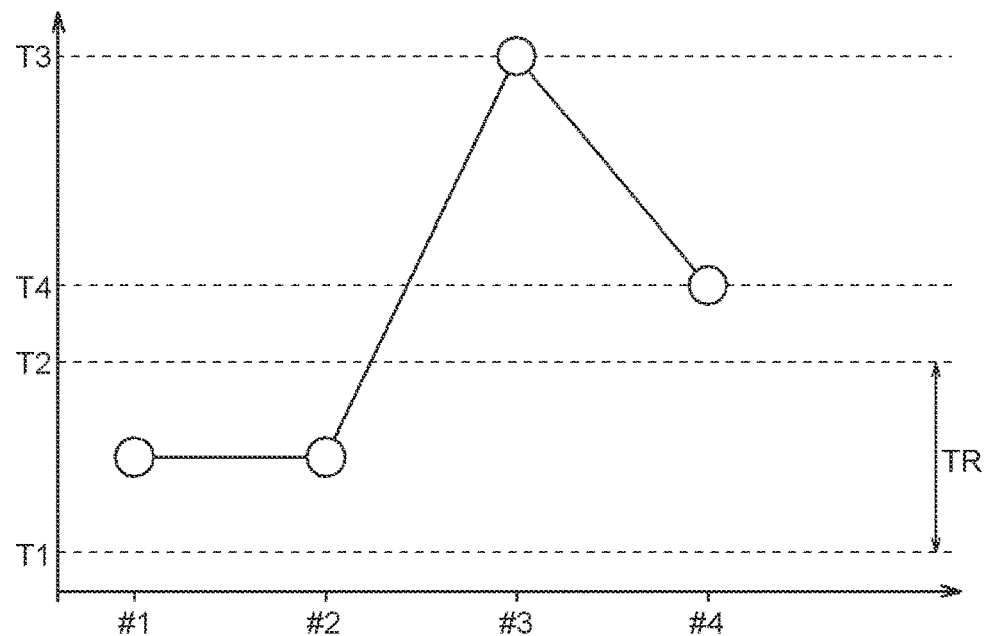
FIG. 2 illustrates an example of a relationship between each step in FIG. 1 and temperatures of a rotor core.

Embodiments of a manufacturing method of a rotor for a permanent magnet-type rotary electric machine serving as a driving source of a vehicle or a power source of a vehicle will be described below with reference to the drawings. A flowchart in FIG. 1 illustrates an example of a manufacturing method of a rotor 10 (a rotor for a rotary electric machine). FIG. 2 illustrates an example of a relationship between each step in FIG. 1 and temperatures of a rotor core. FIGS. 3 to 6 schematically illustrate several steps and articles that are generated with the steps, with members that configure the rotor 10. As illustrated in FIGS. 3 to 6, the manufacturing method of the rotor 10 of the rotary electric machine will be described with an interior permanent magnet rotary electric machine as an example. However, the manufacturing method is not limited to the interior permanent magnet rotary electric machine, and can be applied to a surface permanent magnet rotary electric machine.

Figure 3:
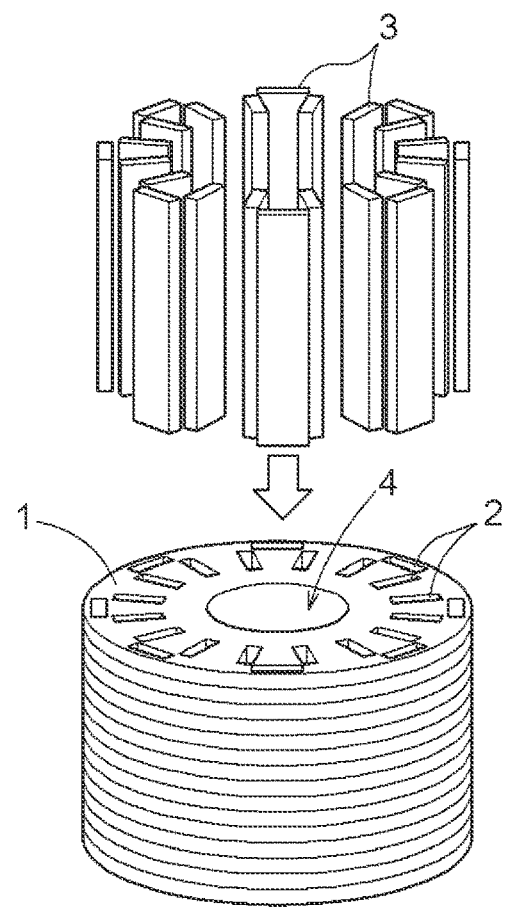
FIG. 3 is an explanatory view illustrating an example of an insertion step.

As illustrated in FIG. 1, the rotor 10 is manufactured through an inserting step #1 (first step), an injecting step #2 (second step), a curing step #3 (third step), and a magnetizing step #4 (fourth step). As illustrated in FIG. 3, the inserting step #1 is a step of inserting a permanent magnet 3 that is not yet magnetized in a magnet insertion hole 2 that is formed in the rotor core 1. If the permanent magnet 3 is magnetized before the permanent magnet 3 is inserted in the magnet insertion hole 2, an attracting force may act on the rotor core 1 and the permanent magnet 3 cannot be appropriately inserted in the magnet insertion hole 2. Thus, in the inserting step #1, the permanent magnet 3 (magnetic material) that is not magnetized is inserted in the magnet insertion hole 2. Examples of the permanent magnet 3 are a neodymium magnet and a samarium cobalt magnet.

The injecting step #2 is a step of injecting a magnet fixing material 5 (supporting material) in the magnet insertion hole 2. The inserting step #1 (first step) and the injecting step #2 (second step) may be performed in a reverse order as the order illustrated in FIG. 1. If the injecting step #2 is performed after the inserting step #1, the injecting step #2 is a step of injecting the magnet fixing material 5 in a clearance between the permanent magnet 3 and the magnet insertion hole 2 in the magnet insertion hole 2. If the injecting step #2 is performed before the inserting step #1, the inserting step #1 is a step of inserting the permanent magnet 3 that is not yet magnetized in the magnet insertion hole 2 in which the magnet fixing material 5 has been injected. Since the permanent magnet 3 that is inserted in the magnet insertion hole 2 may fall out of the magnet insertion hole 2 on its own, the permanent magnet 3 is fixed to the rotor core 1 by using the magnet fixing material 5 such as a thermosetting resin, adhesive, or a foaming agent. The injecting step #2 is a step of injecting the magnet fixing material 5 in the magnet insertion hole 2 before fixation. The curing step #3 is a step of heating the rotor core 1 and the permanent magnet 3 so as to cure the magnet fixing material 5. In the embodiment, the rotor core 1 and the permanent magnet 3 are heated to around 120 degrees Celsius to 200 degrees Celsius, which is a curing temperature T3 of the magnet fixing material 5, in the curing step #3.

The magnetizing step #4 is a step of magnetizing the permanent magnet 3 before the temperature of the rotor core 1 and the permanent magnet 3 lowers to a normal temperature TR, after the curing step #3. Here, the normal temperature TR is a range of temperature (temperature range) that is prescribed beforehand as the normal temperature TR. For example, the normal temperature TR is a prescribed temperature range that is set within a range of 10 degrees Celsius to 35 degrees Celsius. As described above, in the curing step #3, the rotor core 1 and the permanent magnet 3 are heated to around 120 degrees Celsius to 200 degrees Celsius, and this temperature is a higher temperature than the temperature range prescribed as the normal temperature TR. Thus, the term "before decreasing to the normal temperature TR" is the same meaning as before becoming lower than an upper limit temperature of the temperature range. For example, when the temperature range of the normal temperature TR is a range from 10 degrees Celsius to 35 degrees Celsius, the magnetizing step #4 is performed after the curing step #3 and before the temperature of the rotor core 1 and the permanent magnet 3 decreases to 35 degrees Celsius. As a matter of course, the magnetizing step #4 may be performed at a higher temperature if the magnetizing step #4 is performed before the temperature decreases to the normal temperature TR. That is, under a high temperature environment in which the temperature is higher than the temperature range of the normal temperature TR, magnetization is easily performed since the coercivity of the permanent magnet is lower compared to when the temperature is the normal temperature TR. It is thus preferable that the magnetizing step #4 be performed when the temperature of the rotor core 1 and the permanent magnet 3 is a magnetizing temperature T4, which is a temperature higher than the normal temperature TR, such as a temperature equal to or more than 80 degrees Celsius.

FIG. 2 illustrates an example of a transition of the temperature of the rotor core 1 and the permanent magnet 3 in the inserting step #1, the injecting step #2, the curing step #3, and the magnetizing step #4 that are described with reference to FIG. 1. As illustrated in FIG. 2, the inserting step #1 and the injecting step #2 are performed when the temperature of the rotor core 1 and the permanent magnet 3 is the normal temperature TR (lower limit temperature T1: for example zero degrees Celsius, upper limit temperature T2: for example 35 degrees Celsius). It is preferable that the inserting step #1 and the injecting step #2 be performed under a normal temperature environment (at around 25 degrees Celsius, for example) at a place in which the temperature is managed, such as a factory. There is a case in which melted magnet fixing material 5 is injected in the injecting step #2. In such a case, the temperature of the rotor core 1 and the permanent magnet 3 may increase to exceed the normal temperature TR. That is, if the temperature is lower than the curing temperature T3 of the magnet fixing material 5, the injecting step #2 may be performed under a high temperature environment (at 100 degrees Celsius, for example).

In the curing step #3, the rotor core 1 and the permanent magnet 3 are heated so that the temperature of the rotor core 1 and the permanent magnet 3 becomes the curing temperature T3 of the magnet fixing material 5 (120 degrees Celsius to 200 degrees Celsius, for example). The magnetizing step #4 is performed before the temperature of the rotor core 1 and the permanent magnet 3 decreases to the normal temperature TR, preferably at or above the magnetizing temperature T4 (80 degrees Celsius, for example). In the curing step #3 prior to the magnetizing step #4, the rotor core 1 and the permanent magnet 3 are heated until the temperature thereof becomes the curing temperature T3 that is higher than the magnetizing temperature T4. It is thus possible to appropriately magnetize the permanent magnet 3 at the magnetizing temperature T4 without reheating the rotor core 1 and the permanent magnet 3 in the magnetizing step #4.

Figure 4:
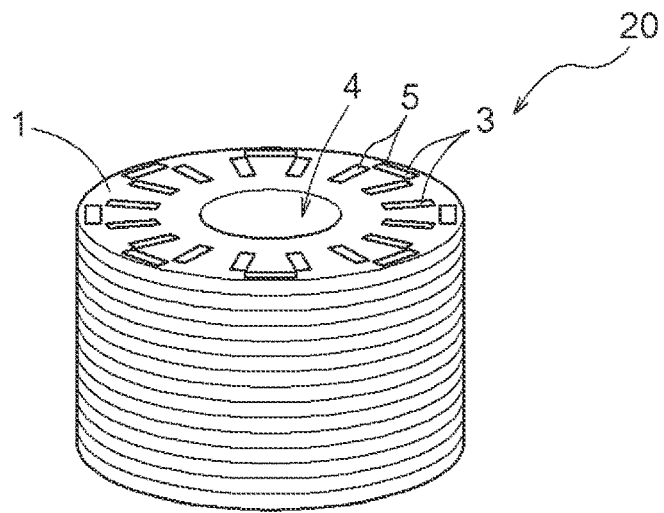
FIG. 4 illustrates an example of an intermediate assembly after a curing step.
Figure 5:
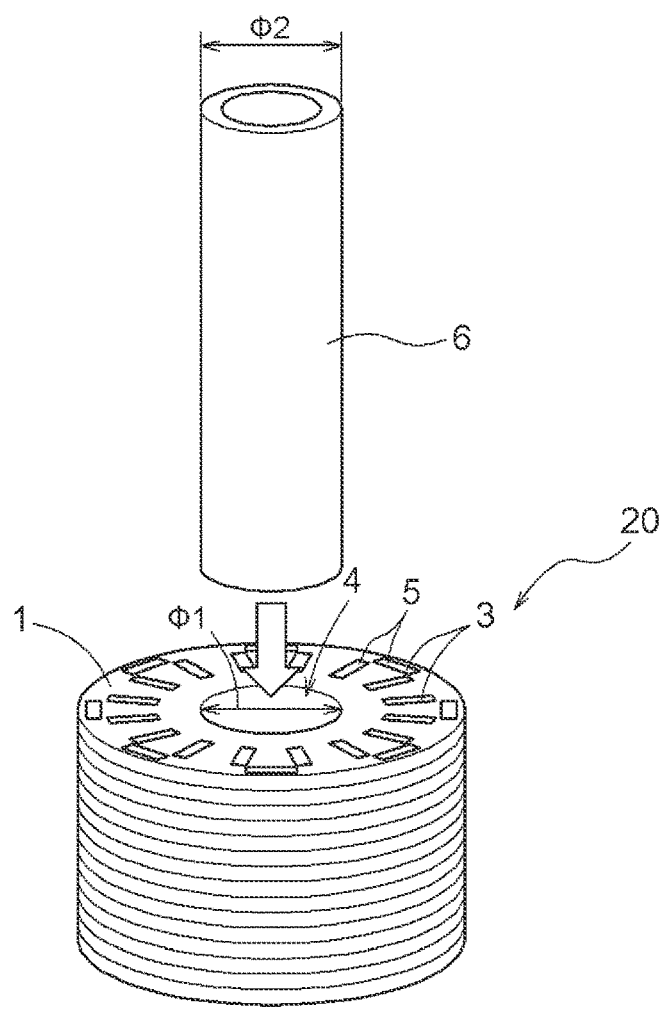
FIG. 5 is an explanatory view of an example of an installing step.

The rotor core 1 has a shaft insertion hole 4 through which the a rotor shaft 6 passes, as illustrated in FIGS. 3 to 5. At the normal temperature TR, an inner diameter φ1 of the shaft insertion hole 4 is equal to or less than an outer diameter φ2 of the rotor shaft 6. The rotor core 1 is heated so that the inner diameter φ1 of the shaft insertion hole 4 is expanded by heat expansion to be larger than the outer diameter φ2 of the rotor shaft 6, and the rotor shaft 6 is inserted in the shaft insertion hole 4, for example. The heating temperature in this case is 100 degrees Celsius, for example. Since the inner diameter φ1 of the shaft insertion hole 4 decreases by contraction when the temperature of the rotor core 1 decreases, the rotor shaft 6 is fixed to the rotor core 1. That is, the rotor shaft 6 is installed in the rotor core 1 by a so-called shrink fitting. The installing step #5 is not limited to shrink fitting and may be performed by press fitting.

Figure 6:
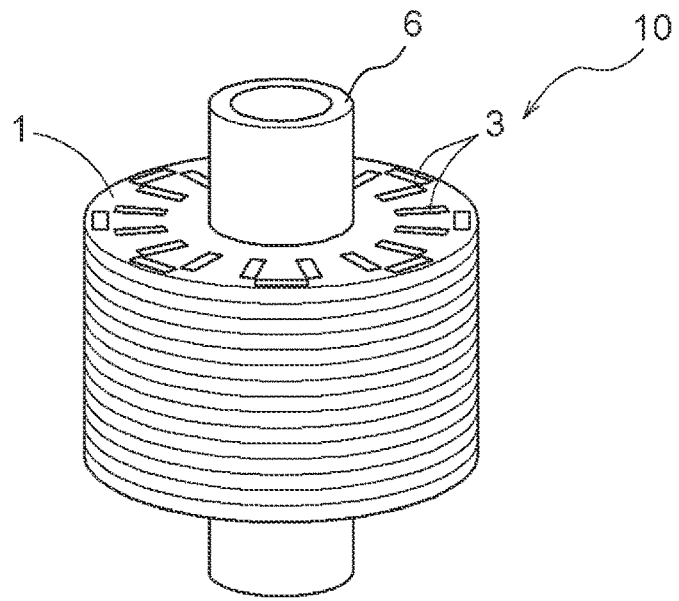
FIG. 6 illustrates an example of a rotor.
Figure 7:
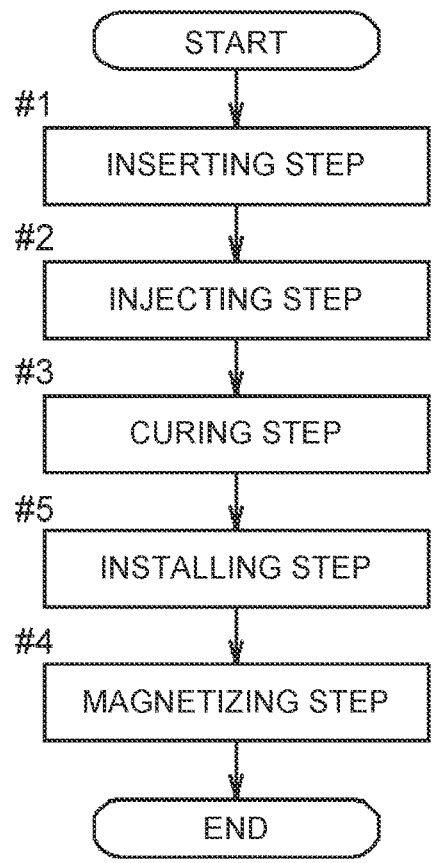
FIG. 7 is a flowchart illustrating another example of the manufacturing method.

As illustrated in FIG. 7, the installing step #5 (fifth step) of inserting the rotor shaft 6 in the shaft insertion hole 4 to install the rotor shaft 6 in the rotor core 1 is performed, after the curing step #3 and before the magnetizing step #4. That is, as illustrated in FIG. 5, the rotor shaft 6 is inserted in the shaft insertion hole 4 of an intermediate assembly 20 that is formed through the curing step #3 so as to form the rotor 10 as illustrated in FIG. 6. As illustrated in FIG. 7, when the installing step #5 is performed after the rotor core 1 and the permanent magnet 3 (intermediate assembly 20) are heated in the curing step #3, there is no need for reheating when performing shrink fitting. The amount of reheating for shrink fitting may otherwise be reduced. The amount of time required for the installing step #5 is shortened and it is thus possible to suppress the manufacturing cost of the rotor 10 from increasing.

Figure 8:
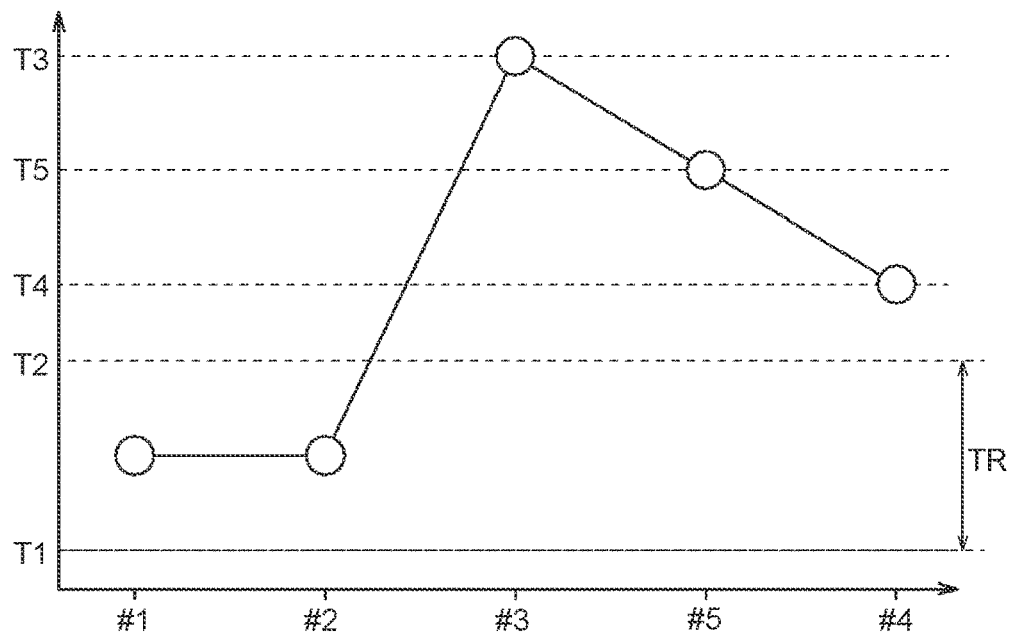
FIG. 8 illustrates an example of a relationship between each step and temperatures of the rotor core in FIG. 7.

FIG. 8 illustrates an example of a transition of the temperature of the rotor core 1 and the permanent magnet 3 in the inserting step #1, the injecting step #2, the curing step #3, the installing step #5, and the magnetizing step #4 that are described with reference to FIG. 7. As illustrated in FIG. 8, the inserting step #1 and the injecting step #2 are performed when the temperature of the rotor core 1 and the permanent magnet 3 is the normal temperature TR. As described above with reference to FIG. 2, there is a case where the melted magnet fixing material 5 is injected in the injecting step #2, and the temperature of the rotor core 1 and the permanent magnet 3 may increase and exceed the normal temperature TR in such a case. In the curing step #3, the rotor core 1 and the permanent magnet 3 are heated so that the temperature of the rotor core 1 and the permanent magnet 3 becomes the curing temperature T3 (120 degrees Celsius to 200 degrees Celsius, for example) and the intermediate assembly 20 is formed.

The installing step #5 is performed when the temperature of the rotor core 1 and the permanent magnet 3 (the temperature of the intermediate assembly 20) is equal to or more than an installing temperature T5 (100 degrees Celsius, for example). In the curing step #3 prior to the installing step #5, the rotor core 1 and the permanent magnet 3 are heated until the temperature thereof becomes the curing temperature T3 that is higher than the installing temperature T5. It is thus possible to appropriately install the rotor shaft 6 in the rotor core 1 (intermediate assembly 20) at the installing temperature T5 without reheating the intermediate assembly 20 (the rotor core 1 and the permanent magnet 3) in the installing step #5.

The magnetizing step #4 that is performed after the installing step #5 is performed before the temperature of the rotor core 1 and the permanent magnet 3 decreases to the normal temperature TR, and preferably at a temperature equal to or more than the magnetizing temperature T4 (80 degrees Celsius, for example). The installing step #5 prior to the magnetizing step #4 is performed with the temperature of the rotor core 1 and the permanent magnet 3 being the installing temperature T5 that is higher than the magnetizing temperature T4. It is thus possible to appropriately magnetize the permanent magnet 3 at or above the magnetizing temperature T4 without reheating the rotor core 1 and the permanent magnet 3 in the magnetizing step #4.

Figure 9:
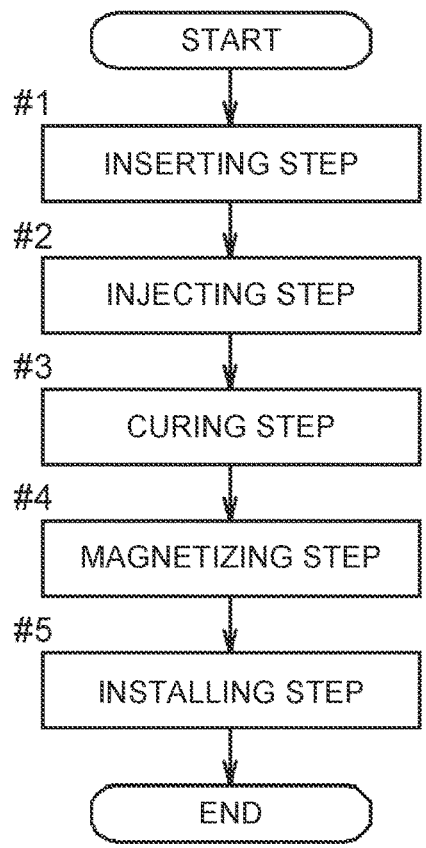
FIG. 9 is a flowchart illustrating another example of the manufacturing method.

The embodiment in which the installing step #5 is performed after the curing step #3 and before the magnetizing step #4 is described above, with reference to FIGS. 7 and 8. However, as illustrated in FIG. 9, the installing step #5 may be performed after the magnetizing step #4. At this time, it is preferable that the installing step #5 be performed before the temperature of the rotor core 1 and the permanent magnet 3 (the temperature of the intermediate assembly 20) decreases to the normal temperature TR. For example, it is preferable that the inner diameter φ1 of the shaft insertion hole 4 be equal to or less than the outer diameter φ2 of the rotor shaft 6 at the normal temperature TR and that the inner diameter φ1 be set to be larger than the outer diameter φ2 of the rotor shaft 6 at the maximum temperature (upper limit temperature T2) of the normal temperature TR. As a matter of course, the intermediate assembly 20 may be reheated in the installing step #5 when required. Even when the installing step #5 is performed by press fitting, the shaft insertion hole 4 is expanded if the temperature is higher than the normal temperature TR, and a force that is needed during press fitting is reduced.

Figure 10:
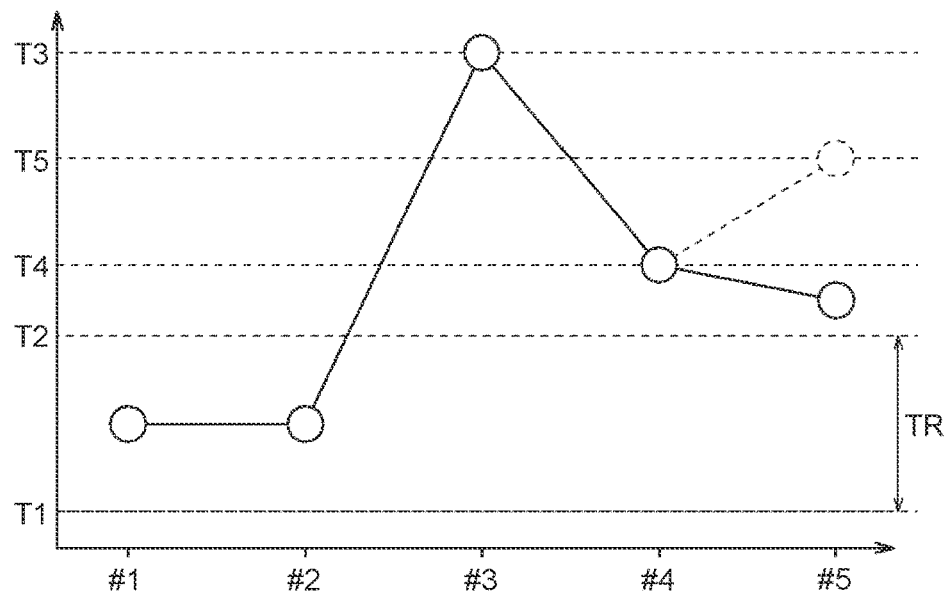
FIG. 10 illustrates an example of a relationship between each step and temperatures of the rotor core in FIG. 9.

FIG. 10 illustrates an example of a transition of the temperature of the rotor core 1 and the permanent magnet 3 in the inserting step #1, the injecting step #2, the curing step #3, the magnetizing step #4, and the installing step #5 that are described with reference to FIG. 9. As illustrated in FIG. 10, the inserting step #1 and the injecting step #2 are performed when the temperature of the rotor core 1 and the permanent magnet 3 is the normal temperature TR. As described above with reference to FIGS. 2 and 8, there is a case where the melted magnet fixing material 5 is injected in the injecting step #2, and the temperature of the rotor core 1 and the permanent magnet 3 may increase and exceed the normal temperature TR. In the curing step #3, the rotor core 1 and the permanent magnet 3 are heated so that the temperature of the rotor core 1 and the permanent magnet 3 becomes the curing temperature T3 (120 degrees Celsius to 200 degrees Celsius, for example) and the intermediate assembly 20 is formed.

The magnetizing step #4 is performed before the temperature of the rotor core 1 and the permanent magnet 3 (the temperature of the intermediate assembly 20) decreases to the normal temperature TR, preferably at or above the magnetizing temperature T4 (80 degrees Celsius, for example). In the curing step #3 prior to the magnetizing step #4, the rotor core 1 and the permanent magnet 3 are heated until the temperature thereof becomes the curing temperature T3 that is higher than the magnetizing temperature T4. It is thus possible to appropriately magnetize the permanent magnet 3 at or above the magnetizing temperature T4 without reheating the rotor core 1 and the permanent magnet 3 in the magnetizing step #4.

The installing step #5 is performed before the temperature of the rotor core 1 and the permanent magnet 3 (the temperature of the intermediate assembly 20) decreases to the normal temperature TR. The magnetizing step #4 prior to the installing step #5 is performed with the temperature of the rotor core 1 and the permanent magnet 3 being higher than the magnetizing temperature T4, which is higher than the normal temperature TR. In the installing step #5, it is possible to appropriately insert the rotor shaft 6 in the shaft insertion hole 4 with press fitting by using the expansion of the rotor core 1 (shaft insertion hole 4). As a matter of course, the intermediate assembly 20 may be reheated in the installing step #5 when required, as described above (the state indicated by a broken line in FIG. 10). Even in this case, it is possible to reduce the heating amount, compared to when heating is performed from the normal temperature TR up to the installing temperature T5.

Figure 11:
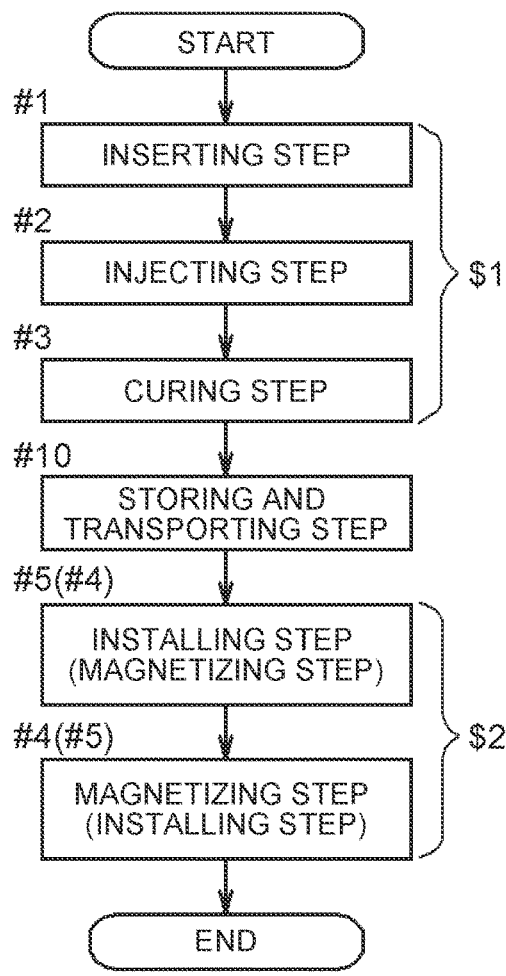
FIG. 11 is a flowchart illustrating a comparative example of the manufacturing methods in FIGS. 1, 7, and 9.
Figure 12:
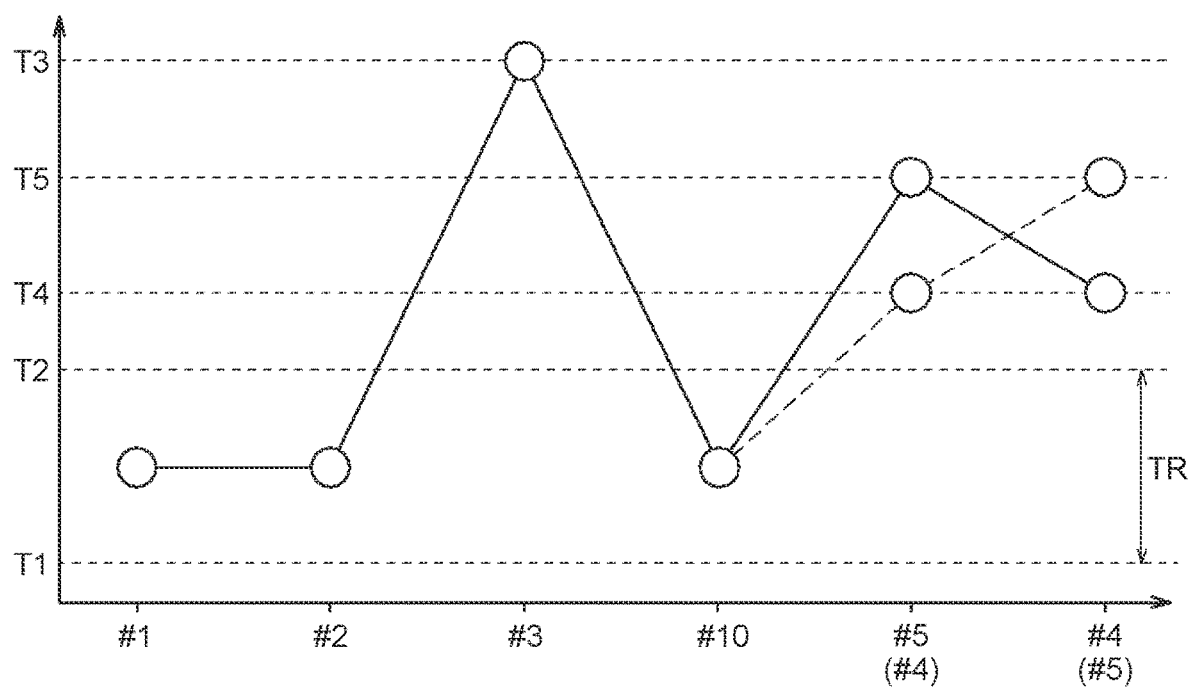
FIG. 12 illustrates an example of a relationship between each step and temperatures of the rotor core in FIG. 11.

FIGS. 11 and 12 illustrate a comparative example of the manufacturing method described above. FIG. 11 is a flowchart of the comparative example of the flowcharts in FIGS. 1, 7, and 9. FIG. 12 illustrates an example of a transition of the temperature of the rotor core 1 and the permanent magnet 3 at each step of the flowchart illustrated in FIG. 11.

As illustrated in FIG. 11, in the comparative example, a first step group $1 including the inserting step #1, the injecting step #2, the curing step #3 and a second step group $2 including the magnetizing step #4 and the installing step #5 are performed discontinuously. That is, a storing and transporting step #10 is performed between the first step group $1 and the second step group $2 so that the continuity of the first step group $1 and the second step group $2 is interrupted. The storing and transporting step #10 is a step of storing the intermediate assembly 20 after the first step group $1 is performed and until the second step group $2 is performed, or a step of transporting the intermediate assembly 20 from the location at which the first step group $1 is performed to the location at which the second step group $2 is performed. Transporting the intermediate assembly 20 includes moving between different factories by using a means of transportation such as a truck.

When the storing and transporting step #10 is performed between the first step group $1 and the second step group $2, the temperature of the intermediate assembly 20 (the temperature of the rotor core 1 and the permanent magnet 3) decreases to the normal temperature TR during the storing and transporting step #10, as illustrated in FIG. 12. When performing the second step group (the installing step #5 and the magnetizing step #4), reheating is thus necessary, which leads to an increase in work hours. In contrast, with the manufacturing method described above with reference to FIGS. 1 to 10, such an increase in work hours is suppressed and the manufacturing cost can be decreased.

Summary of Embodiments

A brief outline of the manufacturing method of the rotor core for the rotary electric machine described above will be provided below.

In one aspect, a manufacturing method of a rotor for a rotary electric machine includes: a first step (#1) of inserting a permanent magnet (3) that is not yet magnetized in a magnet insertion hole (2) that is formed in a rotor core (1); a second step (#2) of injecting a magnet fixing material (5) in the magnet insertion hole (2); a third step (#3) of curing the magnet fixing material (5) by heating the rotor core (1) and the permanent magnet (3); and a fourth step (#4) of magnetizing the permanent magnet (3) before a temperature of the rotor core (1) and the permanent magnet (3) decreases to a normal temperature (TR), after the third step (#3).

In the manufacturing method, the permanent magnet (3) is magnetized by performing the fourth step (#4) before the temperature of the rotor core (1) and the permanent magnet (3) that are heated to cure the magnet fixing material (5) in the third step (#3) decreases to the normal temperature. In general, magnetization is easily performed under a high temperature environment since coercivity of the permanent magnet (3) becomes relatively low. In the manufacturing method, since there is no need to reheat the rotor core (1) when performing the fourth step (#4), there is no need to provide a heating furnace or provide a reheating step. In this way, it is possible to suppress the manufacturing cost of a rotor (10) for the rotary electric machine from increasing. With the manufacturing method, it is therefore possible to provide a technique in which the permanent magnet (3) disposed in the rotor core (1) is appropriately magnetized while an increase in cost is suppressed.

In another aspect, when the rotor core (1) has a shaft insertion hole (4) through which a rotor shaft (6) passes and an inner diameter ($\varphi 1$) of the shaft insertion hole (4) is equal to or less than an outer diameter ($\varphi 2$) of the rotor shaft (6), it is preferable that a fifth step (#5) of inserting the rotor shaft (6) in the shaft insertion hole (4) be performed after the third step (#3) and before the fourth step (#4), in the manufacturing method of a rotor for a rotary electric machine.

In the configuration in which the inner diameter ($\varphi 1$) of the shaft insertion hole (4) is equal to or less than the outer diameter ($\varphi 2$) of the rotor shaft (6), there is a case in which the inner diameter ($\varphi 1$) of the shaft insertion hole (4) is expanded by heat expansion to be larger than the outer diameter ($\varphi 2$) of the rotor shaft (6) through heating the rotor core (1) and the rotor shaft (6) is inserted in the shaft insertion hole (4). Since the inner diameter ($\varphi 1$) of the shaft insertion hole (4) decreases by contraction when the temperature of the rotor core (1) decreases, the rotor shaft (6) is fixed to the rotor core (1). In this way, there is a case in which the rotor shaft (6) is installed in the rotor core (1) by so-called shrink fitting. In the manufacturing method, the fifth step (#5) is performed after the rotor core (1) and the permanent magnet (3) are heated in the third step (#3) for curing the magnet fixing material (5). The heating amount during shrink fitting is decreased, or there is no need for reheating during shrink fitting, and the time required for the fifth step (#5) is shortened. It is thus possible to suppress the manufacturing cost of the rotor (10) for the rotary electric machine from increasing. The fifth step (#5) can be performed by press fitting and the like, instead of shrink fitting. In this case, it is possible to appropriately insert the rotor shaft (6) in the shaft insertion hole (4) with press fitting by using the expansion of the rotor core (1) (expansion of the shaft insertion hole (4)), since the fifth step (#5) is performed after the third step (#3). The fourth step (#4) is performed after the fifth step (#5). Since the temperature of the rotor core (1) and the permanent magnet (3) is high in the fifth step (#5), there is no need to reheat the rotor core (1) when performing the fourth step (#4) and it is possible to suppress the manufacturing cost of the rotor (10) for the rotary electric machine from increasing, as described above.

In another aspect, when the rotor core (1) has a shaft insertion hole (4) through which a rotor shaft (6) passes and an inner diameter ($\varphi 1$) of the shaft insertion hole (4) is equal to or less than an outer diameter ($\varphi 2$) of the rotor shaft (6), it is preferable that a fifth step (#5) of inserting the rotor shaft (6) in the shaft insertion hole (4) be performed after the fourth step (#4) and before the temperature of the rotor core (1) and the permanent magnet (3) decreases to the normal temperature (TR), in the manufacturing method.

As described above, the fifth step (#5) can be performed by shrink fitting or press fitting. In the manufacturing method, the fifth step (#5) is performed after magnetization is performed at a temperature higher than the normal temperature (TR) in the fourth step (#4) and before the temperature of the rotor core (1) and the permanent magnet (3) decreases to the normal temperature (TR). When the fifth step (#5) is performed by press fitting, it is possible to appropriately insert the rotor shaft (6) in the shaft insertion hole (4) by using the expansion of the shaft insertion hole (4). Even when the fifth step (#5) is performed by shrink fitting, there is no need for reheating in the fifth step (#5) depending on a dimensional difference between the rotor shaft (6) and the shaft insertion hole (4), and the heating amount is decreased even if reheating is necessary. Thus, the amount of time required for the fifth step (#5) is shortened and it is possible to suppress the manufacturing cost of the rotor (10) for the rotary electric machine from increasing.

Here, it is preferable that the third step (#3) be a step of curing the magnet fixing material (5) by heating the rotor core (1) and the permanent magnet (3) to increase a temperature up to a curing temperature (T3) of the magnet fixing material (5) that is a temperature higher than the normal temperature (TR). The fourth step (#4) is a step of magnetizing the permanent magnet (3) before the temperature of the rotor core (1) and the permanent magnet (3) that is increased to the curing temperature (T3) decreases to the normal temperature (TR).

As described above, magnetization is easily performed under a high temperature environment since coercivity of the permanent magnet (3) becomes relatively low. In the manufacturing method, the permanent magnet (3) is magnetized by performing the fourth step (#4) before the temperature of the rotor core (1) and the permanent magnet (3) that is increased to the curing temperature (T3) of the magnet fixing material (5) in order to cure the magnet fixing material (5) in the third step (#3) decreases to the normal temperature. There is no need to reheat the rotor core (1) and the permanent magnet (3) when performing the fourth step (#4) and it is thus possible to suppress the manufacturing cost of the rotor (10) for the rotary electric machine from increasing.

What is claimed is:

1. A manufacturing method of a core for a rotary electric machine, the method comprising:
    inserting a permanent magnet that is not yet magnetized in a magnet insertion hole that is formed in a rotor core;
    injecting a magnet fixing material in the magnet insertion hole;
    curing the magnet fixing material by heating the rotor core and the permanent magnet; and
    magnetizing the permanent magnet without reheating and before a temperature of the rotor core and the permanent magnet decreases to a normal temperature, after the curing of the magnet fixing material.

2. The manufacturing method according to claim 1, wherein the rotor core has a shaft insertion hole through which a rotor shaft passes, an inner diameter of the shaft insertion hole is equal to or less than an outer diameter of the rotor shaft, further comprising:
    inserting the rotor shaft in the shaft insertion hole after the curing of the magnet fixing material and before the magnetizing of the permanent magnet.

3. The manufacturing method according to claim 2, wherein
    the curing of the magnet fixing material includes curing the magnet fixing material by heating the rotor core and the permanent magnet to increase a temperature up to a curing temperature of the magnet fixing material that is a temperature higher than the normal temperature, and
    the magnetizing of the permanent magnet incudes magnetizing the permanent magnet before the temperature of the rotor core and the permanent magnet that is increased to the curing temperature decreases to the normal temperature.

4. The manufacturing method according to claim 1, wherein the rotor core has a shaft insertion hole through which a rotor shaft passes, an inner diameter of the shaft insertion hole is equal to or less than an outer diameter of the rotor shaft, further comprising:
    inserting the rotor shaft in the shaft insertion hole after the magnetizing of the permanent magnet and before the temperature of the rotor core and the permanent magnet decreases to the normal temperature.

5. The manufacturing method according to claim 4, wherein
    the curing of the magnet fixing material includes curing the magnet fixing material by heating the rotor core and the permanent magnet to increase a temperature up to a curing temperature of the magnet fixing material that is a temperature higher than the normal temperature, and
    the magnetizing of the permanent magnet incudes magnetizing the permanent magnet before the temperature of the rotor core and the permanent magnet that is increased to the curing temperature decreases to the normal temperature.

6. The manufacturing method according to claim 1, wherein
    the curing of the magnet fixing material includes curing the magnet fixing material by heating the rotor core and the permanent magnet to increase a temperature up to a curing temperature of the magnet fixing material that is a temperature higher than the normal temperature, and
    the magnetizing of the permanent magnet incudes magnetizing the permanent magnet before the temperature of the rotor core and the permanent magnet that is increased to the curing temperature decreases to the normal temperature.

7. The manufacturing method according to claim 1, wherein
    the magnetizing occurs at a first temperature that is above a second temperature when the inserting and the injecting are performed and below a third temperature when the curing is performed.

* * * * *